United States Patent
Jensen et al.

(10) Patent No.: US 10,331,242 B2
(45) Date of Patent: Jun. 25, 2019

(54) STYLUS HAVING A PLURALITY OF OPERATING PORTIONS CONFIGURED TO TRANSMIT SYNCHRONIZED SIGNALS

(71) Applicant: MICROSOFT TECHNOLOGY LICENSING, LLC, Redmond, WA (US)

(72) Inventors: Michael Dale Jensen, Duvall, WA (US); Justin Allan Coppin, Windsor, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

(21) Appl. No.: 14/668,946

(22) Filed: Mar. 25, 2015

(65) Prior Publication Data
US 2016/0282965 A1 Sep. 29, 2016

(51) Int. Cl.
*G06F 3/0354* (2013.01)
*G06F 3/038* (2013.01)
*G06F 3/041* (2006.01)

(52) U.S. Cl.
CPC ........ *G06F 3/0383* (2013.01); *G06F 3/03545* (2013.01); *G06F 3/0416* (2013.01)

(58) Field of Classification Search
CPC ............................ G06F 3/03545; G06F 3/0383
USPC ...................... 178/18.01–19.07; 345/173–183
See application file for complete search history.

(56) References Cited

U.S. PATENT DOCUMENTS

| | | | |
|---|---|---|---|
| 5,793,360 A | 8/1998 | Fleck et al. | |
| 7,406,393 B2 | 7/2008 | Ely et al. | |
| 8,077,155 B2 | 12/2011 | Rehm | |
| 8,154,536 B2 | 4/2012 | Burstrom et al. | |
| 8,427,454 B2 | 4/2013 | Yeh et al. | |
| 2007/0146351 A1 | 6/2007 | Katsurahira et al. | |
| 2007/0188480 A1 | 8/2007 | Teng et al. | |
| 2010/0155153 A1 | 6/2010 | Zachut | |
| 2011/0310066 A1 | 12/2011 | Fermgard et al. | |
| 2012/0000717 A1 | 1/2012 | Hauck | |
| 2012/0242603 A1 | 9/2012 | Engelhardt et al. | |

(Continued)

FOREIGN PATENT DOCUMENTS

| | | |
|---|---|---|
| WO | 2005024544 A2 | 3/2005 |
| WO | 2012123951 A2 | 9/2012 |

OTHER PUBLICATIONS

Rolston, Tim., "Using the Surface Pro 2 Stylus", Published on: Nov. 30, 2013 Available at: http://www.lovemysurface.net/surface-pro-2-stylus/.

(Continued)

*Primary Examiner* — Michael Pervan (57) ABSTRACT

Examples of the disclosure enable a stylus to include a plurality of portions configured to transmit synchronized signals. In some examples, the stylus includes a first portion configured to transmit a first signal in a first pattern, and a second portion configured to transmit a second signal in a second pattern different from the first pattern such that the second signal is distinguishable from the first signal. On receiving the first signal, a user device is configured to provide a first functionality and, on receiving the second signal, the user device is configured to provide a second functionality. Examples of the disclosure enable the stylus to include a plurality of portions configured to interact with a user device in an efficient and/or cost-effective manner.

20 Claims, 6 Drawing Sheets

(56) References Cited

U.S. PATENT DOCUMENTS

2012/0331546 A1 12/2012 Falkenburg et al.
2014/0002422 A1 1/2014 Stern et al.
2014/0035882 A1* 2/2014 Idzik .................... G06F 3/0383
                                                           345/179
2014/0168177 A1 6/2014 Mkrtchyan et al.

OTHER PUBLICATIONS

"International Search Report and Written Opinion Issued in PCT Application No. PCT/US2016/020310", dated May 25, 2016, 11 Pages.
"Second Written Opinion Issued in PCT Application No. PCT/US2016/020310", dated Feb. 6, 2017, 6 Pages.
"International Preliminary Report on Patentability Issued in PCT Application No. PCT/US2016/020310", dated Jun. 1, 2017, 7 Pages.

* cited by examiner

STYLUS HAVING A PLURALITY OF OPERATING PORTIONS CONFIGURED TO TRANSMIT SYNCHRONIZED SIGNALS

BACKGROUND

Known styluses include a tip that interacts with user devices, such as tablets, smartphones, and/or any other computing device including a touchscreen. For example, when the tip is proximate to a digitizer sensor of a touchscreen device, a position of the tip may be interpreted as a user command. To increase the stylus's versatility, at least some styluses include a stand-alone circuit at each tip of the stylus, such that each tip is configured to interact with a user device. Using a plurality of stand-alone circuits, however, requires additional hardware, occupies additional space, consumes additional power, or is generally more expensive than using a single stand-alone circuit. Moreover, using a plurality of stand-alone circuits may result in an unstable timing between the circuits due to resistance-capacitance parameters, potentially resulting in latency at the user device when interacting with the stylus.

SUMMARY

Examples of the disclosure enable a stylus to include a plurality of operating portions in an efficient and cost-effective manner. Some examples include a first portion configured to transmit a first signal, and a second portion configured to transmit a second signal distinguishable from the first signal. In some examples, the first signal is transmitted in a first pattern, and the second signal is transmitted in a second pattern different from the first pattern. For example, the first signal may include one or more first signal bursts transmitted in the first pattern, and the second signal may include one or more second signal bursts transmitted in the second pattern. In some examples, one or more second signal bursts are synchronized with one or more first signal bursts. On receiving the first signal, a user device is configured to provide a first functionality and, on receiving the second signal, the user device is configured to provide a second functionality.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Examples of the disclosure enable a peripheral device, such as a stylus, to include a plurality of operating portions. Some examples include transmitting a first signal from a first portion, and transmitting a second signal from a second portion, such that a user device is able to distinguish between the first signal and the second signal. Based on the distinction, it may be determined whether the signal was transmitted from the first portion or the second portion. In some examples, a user device provides a first functionality upon receiving the first signal or provides a second functionality upon receiving the second signal.

Aspects of the disclosure enable a stylus to efficiently and effectively have a plurality of operating portions. In some examples, the stylus includes a single stand-alone circuit coupled to a head portion of the stylus or a tail portion of the stylus. A signal generated at the tail portion may be synchronized with a signal generated at the head portion (or vice versa) such that the signals have the same or substantially similar characteristics (e.g., timing, amplitude range, frequency range, repetition rate). In this way, the stylus may require fewer resources than styluses having a plurality of stand-alone circuits, the user device may seamlessly interact with both the head portion and the tail portion, signals routed between the stylus head and the stylus tail may be reduced, or the technology may be used with or retrofitted for styluses having various properties and characteristics. By incorporating a head portion and a tail portion in the manner described in this disclosure, some configurations may reduce processor load, require less memory space, increase processing speed, save energy, require less space, simplify software development, reduce hardware requirements, improve usability, enhance reliability, increase system functionality, improve user efficiency via user interface interaction, increase user interaction performance, or reduce error rate.

Figure 1:
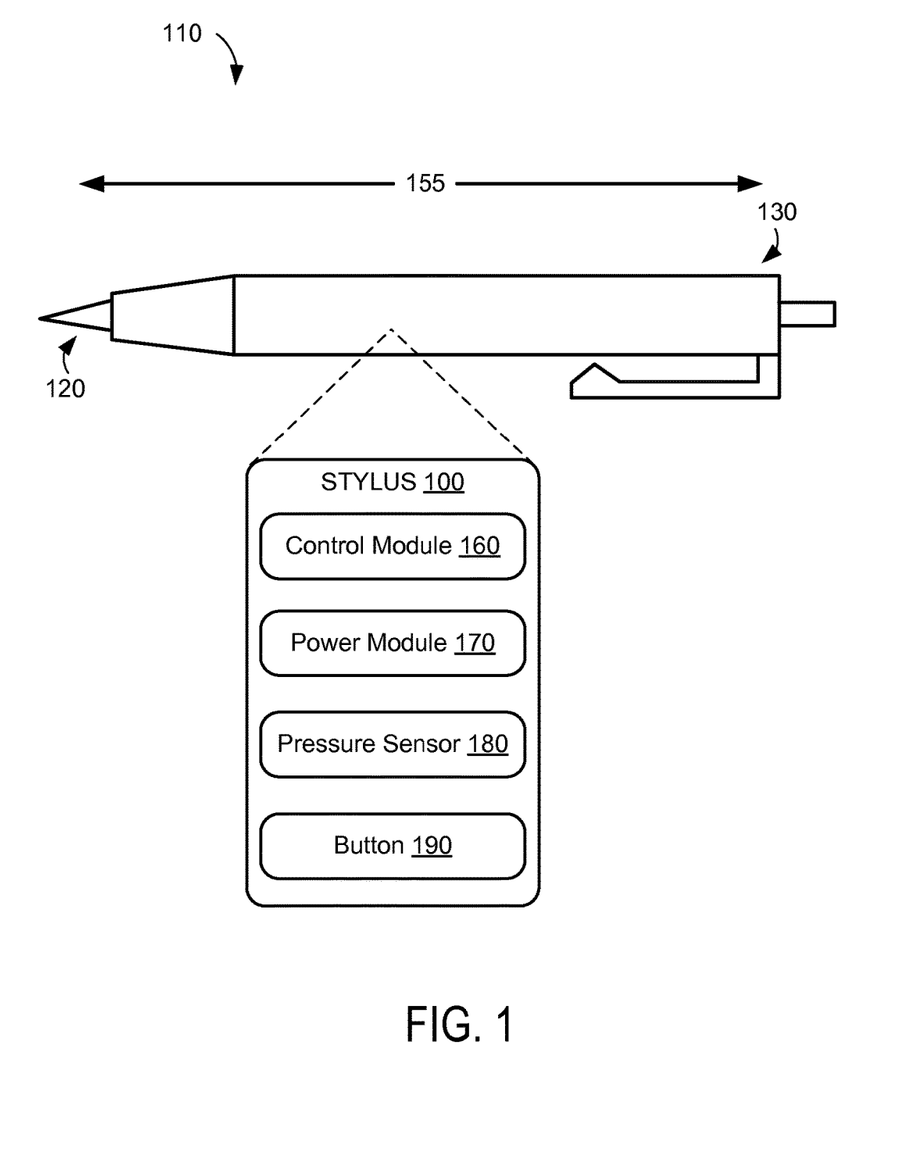
FIG. 1 is a schematic diagram illustrating an example stylus.

FIG. 1 is an illustration of an example stylus 100 including a housing 110 that includes a first portion 120 (e.g., head portion) and a second portion 130 (e.g., tail portion) opposite the first portion 120. The first portion 120 is configured to emit or transmit a first signal 140, and the second portion 130 is configured to emit or transmit a second signal 150. For example, the first signal 140 may be associated with a write function and the second signal 150 may be associated with an erase function. Alternatively, the first signal 140 or second signal 150 may be associated with any functionality (e.g., write, erase, highlight, paint, select) or combination of functionalities that enable the stylus 100 to function as described herein. In at least some examples, the first signal 140 and the second signal 150 are transmitted simultaneously.

The first end portion 120 is spaced at least a predetermined distance 155 from the second portion 130 such that at least a portion of a user device (not shown in FIG. 1) receives no more than one signal (e.g., either no signal or one of the first signal 140 and the second signal 150) at a useable signal strength. In at least some examples, the portion of the user device does not receive the second signal 150 while receiving the first signal 140 and does not receive the first signal 140 while receiving the second signal 150. In other examples, the portion of the user device simultaneously receives both the first signal 140 and the second signal 150 and identifies which signal is proximate to the user device based on a signal strength. For example, when the stylus 100 is oriented substantially perpendicular to a surface of the user device and the first portion 120 is proximate to the surface, the user device receives the first signal 140 and does not receive the second signal 150 (or the second signal 150 is relatively weak compared to the first signal 140 and not useable). In another example, when the stylus 100 is oriented substantially horizontal to the surface of the user device, the first portion 120 is proximate to a first portion of the user device, and the second portion 130 is proximate to a second portion of the user device, the first portion of the user device receives the first signal 140 and does not receive the second signal 150 (or the second signal 150 is relatively weak compared to the first signal 140 and not useable) and the second portion of the user device receives the second signal 150 and does not receive the first signal 140 (or the first signal 140 is relatively weak compared to the second signal 150 and not useable). In some examples, the user device does not distinguish the first signal 150 from the second signal 150 based on the signal strength.

The stylus 100 includes a control module 160 coupled to the first portion 120 or second portion 130, such that the control module 160 is configured to control or manage one or more operations of the stylus 100, first portion 120, or second portion 130. In at least some examples, the control module 160 identifies an input, determines an operating mode based on the input, and generates or adjusts the first signal 140 or second signal 150 based on the operating mode such that the first signal 140 or second signal 150 are transmittable via the first portion 120 or second portion 130, respectively.

The control module 160 includes one or more clock generation sources (e.g., oscillators, crystals) configured to generate a first signal 140 and a second signal 150 having characteristics that are identical or substantially similar to the first signal 140. In this example, the first signal has a first timing, a first amplitude, a first frequency, and a first repetition rate, and the second signal has a second timing that is identical or substantially similar to the first timing, a second amplitude that is identical or substantially similar to the first amplitude, a second frequency that is identical or substantially similar to the first frequency, and a second repetition rate that is identical or substantially similar to the first repetition rate.

In one configuration, the control module 160 may include one or more programmable logic devices that enable the second signal 150 to be synchronized with the first signal 140 and the first signal 140 to be synchronized with the second signal 150. In some examples, the first portion 120 generates a synchronization (sync) signal (shown in FIG. 3) that enables the second portion 130 to synchronize the second signal 150 with the first signal 140. Additionally or alternatively, the second portion 130 generates a sync signal that enables the first portion 120 to synchronize the first signal 140 with the second signal 150. In at least some examples, the first portion 120 or second portion 130 include one or more counters or dividers (e.g., processors, flip-flop circuits) that alter or adjust a timing associated with a signal or one or more level translation circuits that alter or adjust a voltage associated with the signal, such that the first signal 140 and the second signal 150 have characteristics that are identical or substantially similar to each other. Alternatively, the control module 160 may include any technology or mechanism that enables the stylus 100 to function as described herein.

In one example, the stylus 100 includes a power module 170 coupled to the control module 160, the first portion 120, and the second portion 130, such that the power module 170 is configured to provide power to the control module 160, the first portion 120, and the second portion 130. The power module 170 includes one or more batteries. In one example, the power module 170 includes a first battery configured to provide power to the first portion 120, and a second battery configured to provide power to the second portion 130. The power module 170 may include any number of batteries that enables the stylus 100 to function as described herein.

One or both the first portion 120 and the second portion 130 may include or be associated with a pressure sensor 180 configured to detect or identify a pressure associated with the corresponding portion. In at least some examples, the pressure sensor 180 enables the control module 160 to determine or identify how much pressure is applied (or if no pressure is applied) to the corresponding portion. For example, the pressure sensor 180 may provide input to the control module 160 based on the identified pressure, and the control module 160 may generate or adjust the first signal 140 or the second signal 150 based at least partially on the input provided by the pressure sensor 180.

The stylus 100 includes one or more buttons 190 (e.g., push buttons, toggle switches) configured to receive input associated with the first portion 120 or second portion 130. In at least some examples, the buttons 190 enable a user to provide input to the control module 160. For example, a user may use a button 190 to implement a left-click operation by clicking a left button (e.g., select an icon, switch between a write mode and an erase mode) or implement a right-click operation by clicking a right button (e.g., view menu options). Alternatively, any button may be actuated in any manner to perform any operation that enables the stylus 100 to function as described herein.

Figure 2:
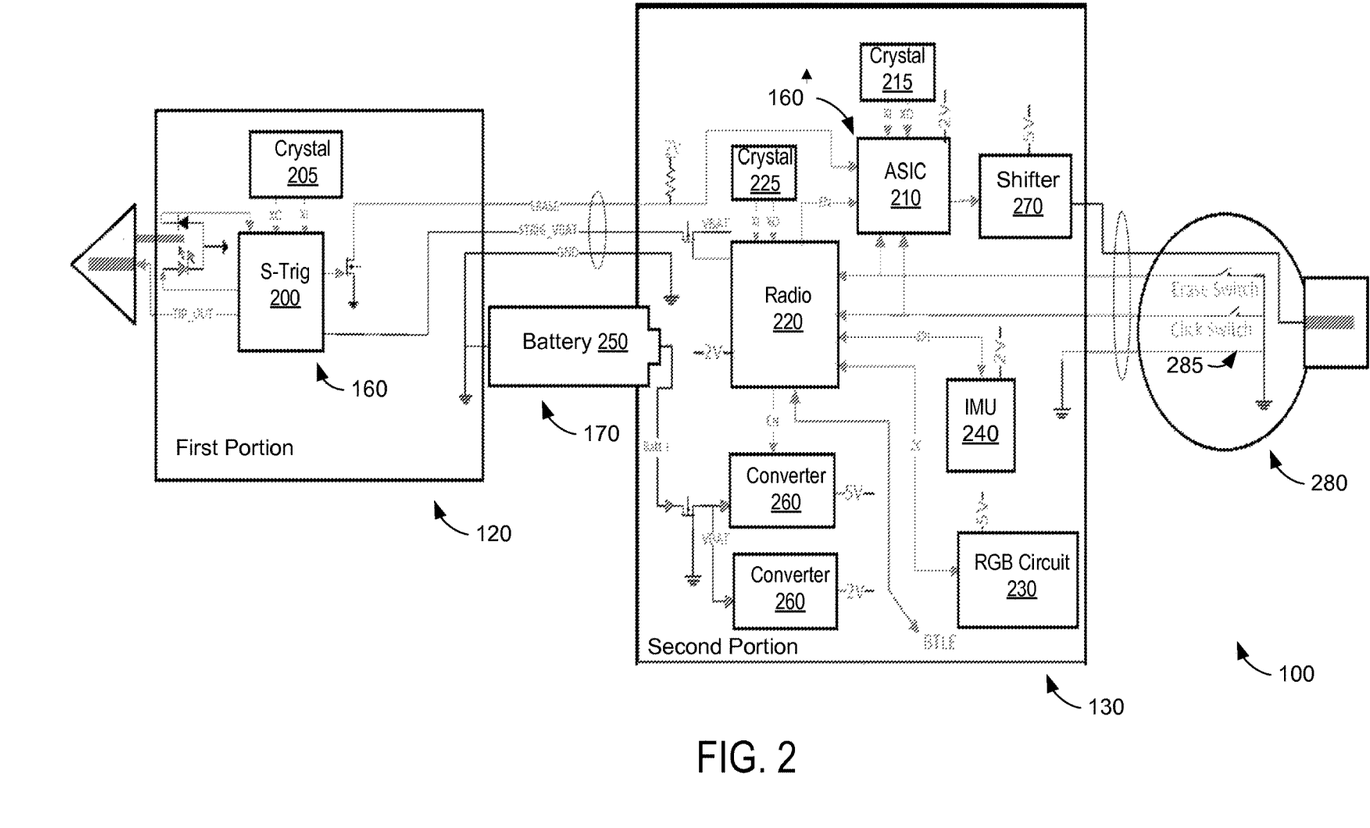
FIG. 2 is a schematic diagram illustrating example hardware that may be used with a stylus, such as the stylus shown in FIG. 1.

FIG. 2 is a schematic diagram illustrating example hardware that may be used with the stylus 100. In this example, the stylus 100 includes a first portion 120 and a second portion 130. As shown in FIG. 2, the second portion 130 is different from and, in this example, complements the first portion 120.

In this example, the control module 160 includes a plurality of components that are spaced about the first portion 120 and the second portion 130. For example, the first portion 120 may include a short circuit trigger ("S-Trig") 200 and a clock generation source 205 (e.g., a 32.768 kHz crystal) associated with the S-Trig 200, and the second portion 130 may include an application-specific integrated circuit ("ASIC") 210 and a clock generation source 215 (e.g., a 100 kHz crystal) associated with the ASIC 210. In this example, the S-Trig 200 generates or adjusts the first signal 140 (e.g., write signal, hover signal) and the sync signal (shown in FIG. 3) and, based on the sync signal, the ASIC 210 generates or adjusts the second signal 150, such that the second signal 150 is in sync with the first signal 140.

The first portion 120 and/or the second portion 130 may include a radio 220, a clock generation source 225 (e.g., a 16 MHz crystal) associated with the radio 220, an RGB circuit 230, and an inertial measurement unit ("IMU") 240. In this example, the radio 220 enables the stylus 100 to exchange data with another computing device using, for example, a BLUETOOTH brand wireless technology standard. (BLUETOOTH is a trademark of Bluetooth Special Interest Group). The RGB circuit 230 may include one or more light emitting diodes configured to emit a light associated with a functionality or operation of the stylus 100. In this example, the IMU 240 includes one or more accelerometers (not shown) that detects/measures a movement or orientation of the stylus 100. In at least some examples, the IMU 240 is used to provide an interrupt signal to wake the stylus 100 upon detecting motion.

In this example, the power module 170 is coupled to the control module 160, the first portion 120 and the second portion 130, such that the power module 170 is configured to provide power to the control module 160, the first portion 120, and the second portion 130. The power module 170 may include a single battery 250 that provides power, a plurality of boost converters 260 that step up a voltage provided by the battery 250, and a level shifter 270 that enables various components within the stylus 100 to interact with each other by shifting or translating one or more operating parameters associated with the various components (e.g., signals, voltages, logic levels).

In one example, the stylus 100 includes a third portion 280. The third portion 280 may include one or more switches 285 that enable a clean interface to be provided to one or more buttons 190 (shown in FIG. 1). Alternatively, any number of components may be arranged in any manner that enables the control module 160 to function as described herein.

Figure 3:
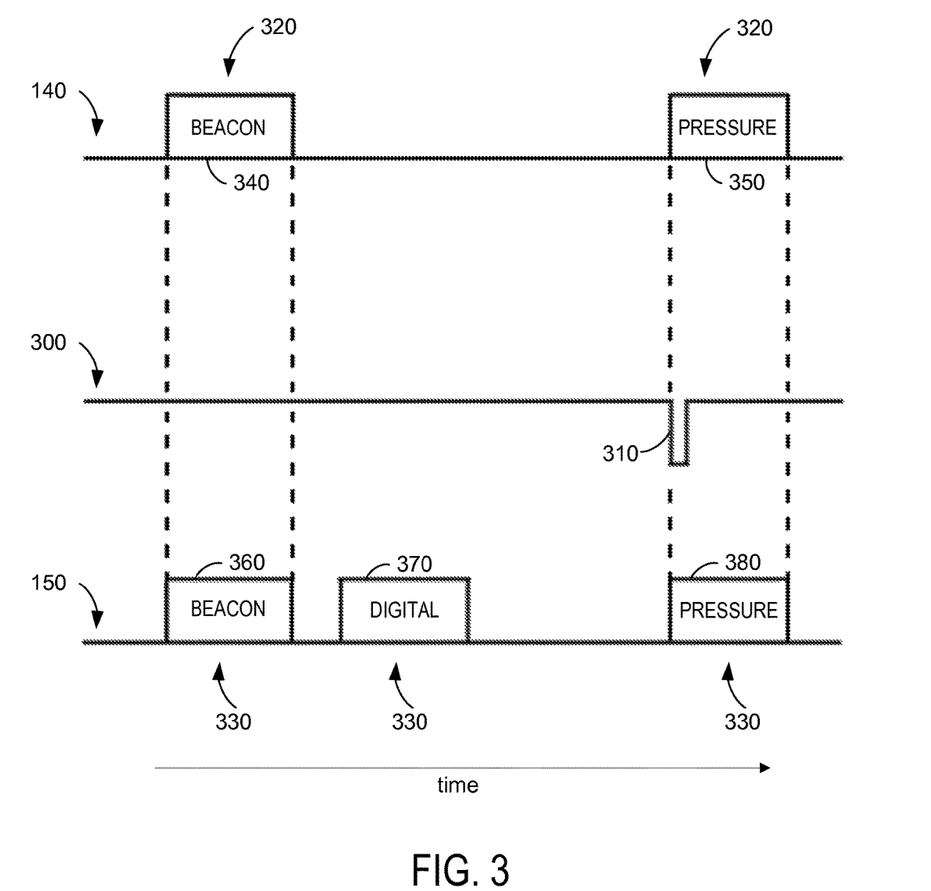
FIG. 3 is a schematic diagram illustrating a plurality of signals that may be transmitted from a stylus, such as the stylus shown in FIG. 1.

FIG. 3 is a schematic diagram illustrating the first signal 140, a synchronization (sync) signal 300, and the second signal 150. The first signal 140, sync signal 300, and second signal 150 may be transmitted in a repeat cycle at a predetermined repetition rate. The sync signal 300 includes a trigger 310 that provides a reference point for synchronization. For example, the first signal 140, the sync signal 300, and the second signal 150 may be synchronized based on a falling edge of the sync signal 300, which is configured to repeat approximately every 15 ms. Alternatively, the first signal 140, the sync signal 300, or the second signal 150 may be synchronized based on any reference point that occurs at any repetition rate that enables the stylus 100 to function as described herein.

The first signal 140 and the second signal 150 are synchronized, such that a computing device (e.g., a touchscreen device) is configured to seamlessly switch between receiving the first signal 140 and receiving the second signal 150, thereby reducing a latency associated with responding to a change in received signals. The sync signal 300 is transmitted from the first portion 120 towards the second portion 130 to enable the second signal 150 to be synchronized with the first signal 140 or is transmitted from the second portion 130 towards the first portion 120 to enable the second signal 140 to be synchronized with the second signal 150. In at least some examples, a timing or synchronization of the first signal 140 or second signal 150 is generated by utilizing one or more counters or dividers that alter or adjust a timing associated with a signal. Alternatively, the sync signal 300 may have any configuration that enables the stylus 100 to function as described herein.

The first signal 140 and second signal 150 may each be associated with a makeup (e.g., a pattern of packets, signals, signal configurations, signal bursts, or types of signals) that enables the first signal 140 and the second signal 150 to be synchronized or distinguished from one another. In one configuration, the first signal 140 and the second signal 150 may include content associated with the makeup. The first signal 140 may be transmitted in a first pattern including one or more first signal bursts 320, and the second signal 150 may be transmitted in a second pattern including one or more second signal bursts 330 different from the first signal bursts 320, such that the second signal 150 is distinguishable from the first signal 140 based on the respective content or makeup of the first signal 140 and the second signal 150.

In some examples, the first signal bursts 320 or second signal bursts 330 are transmitted in a predetermined sequence of bursts in accordance with a predetermined schedule. In this example, the first signal bursts 320 include one or more first beacon signal bursts 340 and one or more first pressure signal bursts 350, and the second signal bursts 330 include one or more second beacon signal bursts 360, one or more digital signal bursts 370, and one or more second pressure signal bursts 380. Alternatively, the first signal bursts 320 or the second signal bursts 330 may be associated with (or have content that is associated with) any makeup that enable the stylus 100 to function as described herein.

For example, a timing associated with the beacon signal bursts 340, 360, the digital signal bursts 370, and the pressure signal bursts 350, 380 is set or established with respect to the trigger 310. A timing associated with the trigger 310 may be set/established with respect to the beacon signal bursts 340, 360, the digital signal bursts 370, and pressure signal bursts 350, 380, such that the computing device is configured to anticipate a predetermined signal (or type of signal (e.g., signal bursts)) in accordance with a predetermined schedule.

The beacon signal bursts 340, 360 enable a computing device, such as a user device (shown in FIG. 4), to identify a location or proximity of a portion (either the first portion 120 or the second portion 130). The first beacon signal burst 340 and the second beacon signal burst 360 are substantially similar in content or makeup. In this example, the beacon signal bursts 340, 360 are synchronized to be generated or transmitted approximately 7.5 ms after the trigger 310 and include approximately 32 pulses at approximately 25 kHz within a window of approximately 1.28 ms. Alternatively, the beacon signal bursts 340, 360 may be associated with any parameter that enables the first signal or second signal 150 to function as described herein.

The pressure signal bursts 350, 380 enable the computing device to identify whether pressure is applied to the each portion. For example, the pressure signal bursts 350, 380 may include pressure-related information associated with a pressure sensor 180 at the first portion 120 and/or second portion 130. The first pressure signal burst 350 and the second pressure signal burst 380 are substantially similar in content or makeup. In this example, the pressure signal bursts 350, 380 are synchronized to be generated or transmitted with or immediately after the trigger 310 and include approximately 25 pulses at approximately 20 kHz within a window of approximately 1.28 ms. Alternatively, the pressure signal bursts 350, 380 may be associated with any parameter that enables the first signal 140 or second signal 150 to function as described herein. In at least some examples (e.g., when the pressure sensor 180 does not detect a pressure), the pressure signal bursts 350, 380 are not generated or transmitted.

The digital signal bursts 360 enable the computing device to identify/determine an identity of the stylus 100, and a status associated with the stylus 100, the first portion 120, the second portion 130 and one or more buttons 190. For example, the digital signal bursts 360 may include (or be associated with) a device identity and a command payload (e.g., instructions regarding a functionality associated with the stylus 100, first portion 120, and second portion 130). Alternatively, the digital signal bursts 360 may include any information that enables the second signal 150 to function as described herein. In this example, the digital signal bursts 360 are synchronized to be generated or transmitted approximately 10-40 µs after the generation/transmission of the beacon signal bursts 340, 360 and include approximately 32 pulses at approximately 25 kHz within a window of approximately 1.28 ms. Alternatively, the digital signal bursts 360 may be associated with any parameter that enables the second signal 150 to function as described herein.

Figure 4:
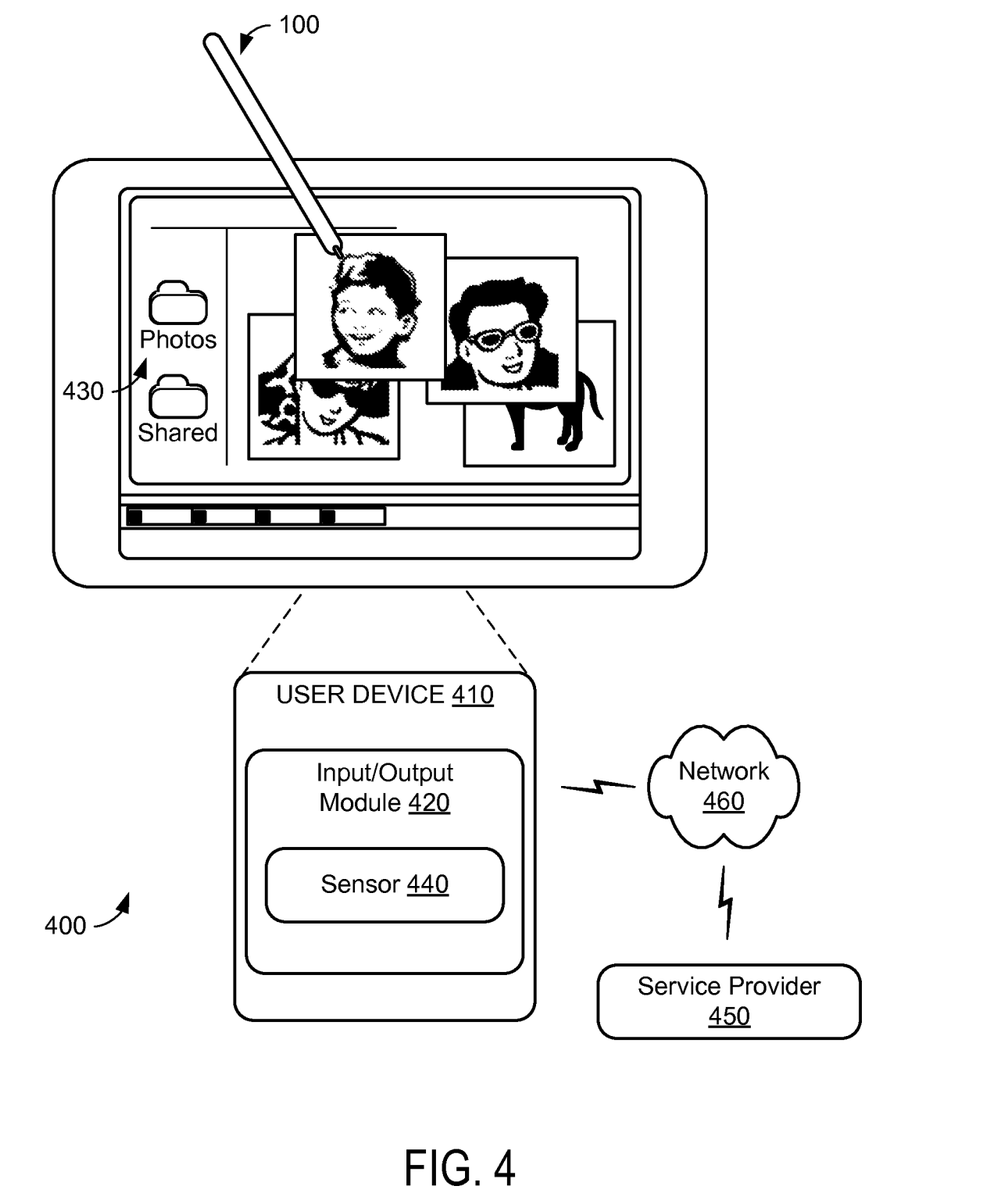
FIG. 4 is a schematic diagram illustrating an example environment in which a stylus, such as the stylus shown in FIG. 1, may be used.

FIG. 4 is a schematic diagram illustrating an example system or environment 400 including the stylus 100 and a user device 410. The user device 410 may range from a full resource device with substantial memory and processor resources (e.g., a desktop computer) to a low-resource device with limited memory or processing resources (e.g., a set-top box). For example, the user device 410 may be configured as a desktop computer, a set-top box, a laptop computer, a game console, a portable media player, a mobile telephone, a tablet, a netbook, a computing pad, a kiosk, a tabletop device, an industrial control device, a wireless charging station, an electric automobile charging station, or any other computing device.

The user device 410 includes an input/output module 420 configured to identify one or more inputs and cause one or more operations to be performed that correspond to the inputs. Gestures may be identified by the input/output module 420 in a variety of different ways. For example, the input/output module 420 may be configured to recognize a touch input, such as the stylus 100 proximate to a display device 430 of the user device 410, using touchscreen functionality.

In this example, the input/output module 420 includes one or more sensors 440 (e.g., digitizer sensors) configured to detect a position or movement associated with the touch input, which may be interpreted by the input/output module 420 as one or more user commands. In at least some examples, the sensors 440 detect position or movement while the stylus 100 is touching or hovering over a detection surface of the sensor 440. One or more sensors 440 are integrated with the display device 430, and a position or movement associated with the touch input is correlated with data or information presented on the display device 430. For example, the sensors 440 may be spaced about a surface of the display device 430.

The first portion 120 and the second portion 130 are each configured to interact with the user device 410 when positioned in contact with or proximate to the sensors 440. For example, a sensor 440 may be configured to detect the first signal 140 when the first portion 120 is in contact with or proximate to the sensor 440 and to detect the second signal 150 when the second portion 130 is in contact with or proximate to the sensor 440. In at least some examples, the sensor 440 is configured to detect the first signal 140 or the second signal 150 when the first portion 120 or the second portion 130 are positioned within or approximately at a predetermined hovering distance. For example, the hovering distance may be approximately 4.0 cm. Alternatively, the hovering distance may be any length that enables the stylus 100 or the user device 410 to function as described herein.

When the first portion 120 and the second portion 130 are both positioned outside the predetermined hovering distance, in at least some examples, the sensor 440 does not detect/receive the first signal 140 or the second signal 150 (e.g., the first portion 120 or the second portion 130 do not interact with the user device 410). In other examples, the sensor 440 detects/receives the first signal 140 or the second signal 150 at a signal strength that is at or below a predetermined threshold level such that the user device 410 ignores or dismisses the first signal 140 and the second signal 150 (e.g., the first portion 120 or the second portion 130 do not interact with the user device 410).

The length of the stylus 100 is greater than the hovering distance such that the second portion 130 is spaced from the first portion 120 a distance (e.g., predetermined distance 155) greater than the hovering distance. In this way, when a portion of the stylus 100 (e.g., the first portion 120) is positioned within the hovering distance of a sensor 440 such that the portion of the stylus 100 interacts with the user device 410, another portion of the stylus 100 (e.g., the second portion 130) is not within the hovering distance of the sensor 440 and does not interact with the user device 410. The distance between the first portion 120 and the second portion 130 increases a likelihood that the sensor 440 does not simultaneously detect the first signal 140 and the second signal 150 (e.g., at a signal strength above the predetermined threshold), thereby enabling the user device 410 to identify/determine which portion of the stylus 100 (e.g., the first portion 120 or the second portion 130) is interacting with the user device 410.

A variety of different types of gestures may be recognized by the input/output module 420, such as gestures that are recognized from a single type of input as well as gestures involving multiple types of inputs. For example, the user device 410 may be configured to detect and differentiate between a touch input provided by the first portion 120 and a touch input provided by the second portion 130. This differentiation may then serve as a basis to identify a gesture from the touch inputs and consequently an operation that is to be performed based on identification of the gesture. For example, the user device 410 may provide a first functionality (e.g., writing) upon receiving the first signal 140 and provide a second functionality (e.g., erasing) that is different from the first functionality upon receiving the second signal 150. In some examples, a functionality associated with the first portion 120 or second portion 130 is selectable or adjustable based on a user interaction with the stylus 100 or user device 410.

After receiving the first signal 140 or the second signal 150, the user device 410 determines or identifies a proximity of the corresponding portion (either the first portion 120 or the second portion 130) based on the information associated with the beacon signal bursts 340, 360. In at least some examples, upon receiving the first signal 140 or the second signal 150, the user device 410 determines or identifies whether the corresponding portion (the first portion 120 or the second portion 130) is in a touch mode or a hover mode based on the information associated with the pressure signal bursts 350, 380. Upon receiving a signal (the first signal 140 or the second signal 150), the user device 410 determines/ identifies whether one or more buttons 190 are pressed, flipped, or otherwise actuated based on the information associated with the digital signal bursts 370. In at least some examples, the stylus 100 generates the digital signal bursts 370 of the first signal 140 and/or the second signal 150 based on a position of one or more buttons 190. For example, the content of the digital signal bursts 370 may be indicative of the position of the buttons 190 (e.g., left-button clicked, right-button clicked).

The user device 410 may be configured to obtain data local to the user device 410, stored in the stylus 100, or obtained from one or more network services implemented by a service provider 450 for access via a network 460. The data may take a variety of forms, such as configuration data to configure a user interface for the particular user, to maintain state across user devices, to login the user to the use device 410, current pen tool mode (e.g. lasso selection mode vs. cut-out tool vs. pen gesture mode vs. inking mode), current pen color and nib (or type of brush/tool) settings, and so on.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the user device 410 may also include an entity (e.g., software) that causes hardware of the user device 410 to perform operations, e.g., processors, functional blocks, and so on. For example, the user device 410 may include a computer-readable medium that may be configured to maintain instructions that cause the computing device, and more particularly hardware of the user device 410 to perform operations. Thus, the instructions function to configure the hardware to perform the operations and in this way result in transformation of the hardware to perform functions. The instructions may be provided by the computer-readable medium to the user device 410 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 5:
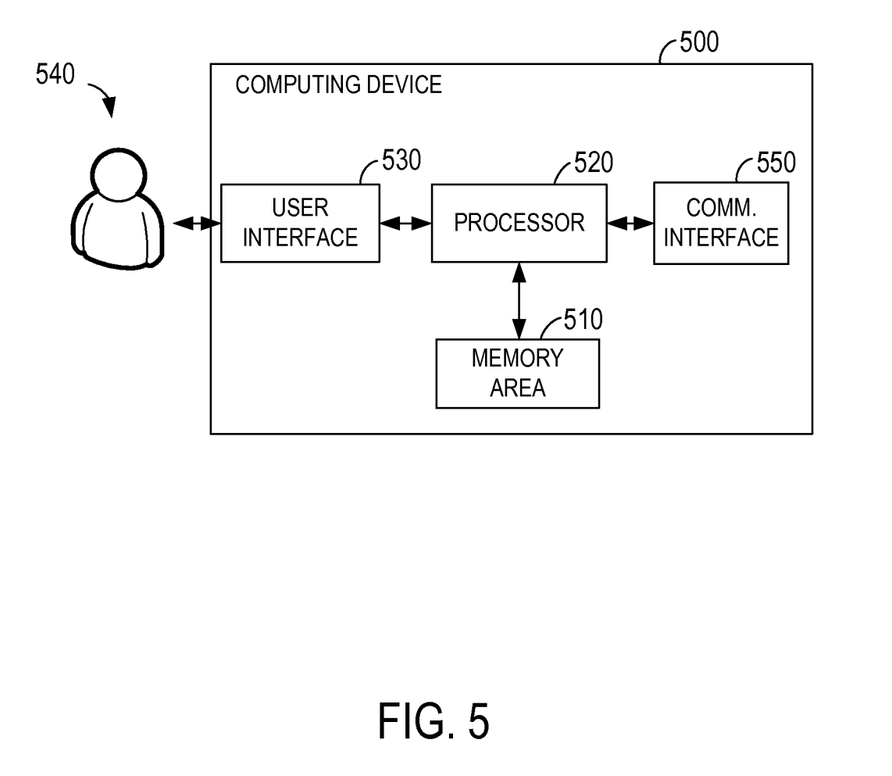
FIG. 5 is a schematic diagram illustrating an example computing device that may be used in the environment, such as the environment shown in FIG. 4.

FIG. 5 is a schematic diagram illustrating an example computing device 500, such as the stylus 100 (shown in FIG. 1) or the user device 410 (shown in FIG. 4). While some examples of the disclosure are illustrated and described herein with reference to a computing device being a stylus 100 or a user device 410, aspects of the disclosure are operable with any computing device or server that executes instructions to implement the operations and functionality associated with the computing device or the server. For example, the computing device 500 may include a desktop computer, a set-top box, a laptop computer, a game console, a portable media player, a mobile telephone, a tablet, a netbook, a computing pad, a kiosk, a tabletop device, an industrial control device, a wireless charging station, an electric automobile charging station, or any other computing device. Additionally, the computing device 500 may represent a group of processing units or other computing devices.

In this example, the computing device 500 includes one or more computer-readable media, such as a memory area 510 storing computer-executable instructions, a control module 160 (shown in FIG. 1), a input/output module 420 (shown in FIG. 4), user configurations, device identities, and other data, and one or more processors 520 programmed to execute the computer-executable instructions for implementing aspects of the disclosure. The memory area 510 includes any quantity of media associated with or accessible by the computing device. The memory area 510 may be internal to the computing device (as shown in FIG. 5), external to the computing device (not shown), or both (not shown).

The processor 520 includes any quantity of processing units, and the instructions may be performed by the processor 520 or by multiple processors within the computing device or performed by a processor external to the computing device. The processor 520 is programmed to execute instructions such as those illustrated in the figures (e.g., FIG. 6).

The processor 520 is transformed into a special purpose microprocessor by executing computer-executable instructions or by otherwise being programmed. For example, the control module 160, when executed by the processor 520, causes the processor 520 to identify an input, determine an operating mode based on the input, and generate the first signal 140 and/or the second signal 150 based on the operating mode; and the input/output module 420, when executed by the processor 520, causes the processor 520 to provide a first functionality upon receiving the first signal 140 and provide a second functionality different from the first functionality upon receiving the second signal 150. Although the processor 520 is shown separate from the memory area 510, examples of the disclosure contemplate that the memory area 510 may be onboard the processor 520 such as in some embedded systems.

The computing device 500 includes at least one user interface 530 for exchanging data between the computing device 500 and a user 540. For example, the user interface 530 includes or is coupled to a presentation device (e.g., display device 430) configured to present information, such as text, images, audio, video, graphics, alerts, and the like, to the user 540. The presentation device may include, without limitation, a display, a speaker, and/or a vibrating component. Additionally or alternatively, the user interface 530 includes or is coupled to an input device (not shown) configured to receive information, such as user commands, from the user 540. The input device may include, without limitation, a controller, a camera, a microphone, and/or an accelerometer. In at least some examples, the presentation device and the input device are integrated in a common user interface 530 configured to present information to the user 540 and receive information from the user 540. For example, the user-interface device may include, without limitation, a capacitive touch screen display and/or a controller including a vibrating component.

The computing device 500 includes at least one communication interface 550 for exchanging data between the computing device 500 and a computer-readable media or another computing device. In this example, the stylus 100 is coupled to the user device 410 using a BLUETOOTH brand wireless technology standard or the user device 410 is coupled to the service provider 450 via the network 460. (BLUETOOTH is a trademark of Bluetooth Special Interest Group). Communication between the computing device 500 and a computer-readable media or another computing device may occur using any protocol or mechanism over any wired or wireless connection.

The block diagram of FIG. 5 is merely illustrative of an example system that may be used in connection with one or more examples of the disclosure and is not intended to be limiting in any way. Further, peripherals or components of the computing devices known in the art are not shown, but are operable with aspects of the disclosure. At least a portion of the functionality of the various elements in FIG. 5 may be performed by other elements in FIG. 5, or an entity (e.g., processor, web service, server, applications, computing device, etc.) not shown in FIG. 5.

Figure 6:
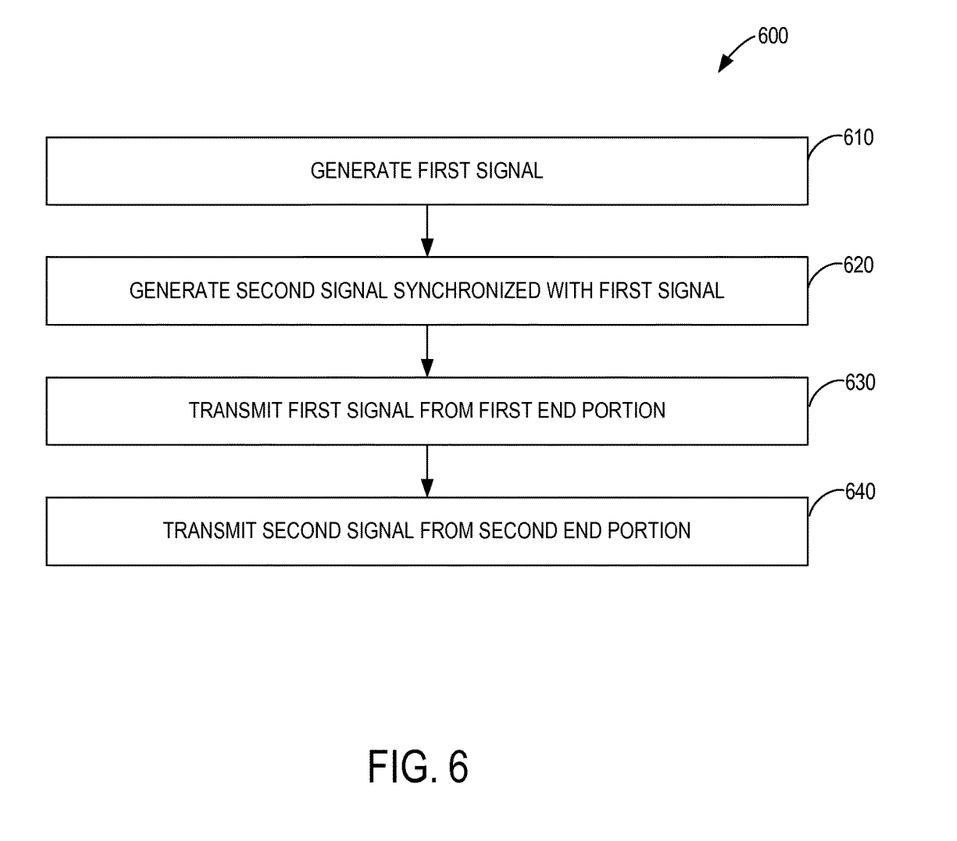
FIG. 6 is a flow chart illustrating an example method of operating a stylus, such as the stylus shown in FIG. 1.

FIG. 6 is a flow chart illustrating an example method 600 in which a user is using a stylus 100. The following discussion describes stylus computing environment techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

During use, a first signal 140 is generated at 610, and a second signal 150 is generated at 620. One or more first signal bursts 320 are generated for use with the first signal 140, and one or more second signal bursts 330 are generated for use with the second signal 150. For example, an input (e.g., a pressure associated with a pressure sensor 180, a status associated with a button 190) may be identified and an operating mode associated with the stylus 100 and the corresponding portion (either the first portion 120 or the second portion 130) may be determined based on the input. The operating mode may be encoded into at least one signal burst (for example, at least one signal burst of the first signal bursts 320 or of the second signal bursts 330). One or more signal bursts of the second signal bursts 330 are synchronized with one or more signal bursts of the first signal bursts 320, such that a user device 410 is configured to expect a signal (e.g., first signal 140, second signal 150) in accordance with a predetermined schedule. For example, at least one first signal burst 320 may be configured to be transmitted within a predetermined window of time, and at least one second signal burst 330 may be configured to be transmitted within the same or a similar predetermined window of time as the first signal burst 320.

The first signal 140 is transmitted from a first portion 120 at 630, and the second signal 150 is transmitted from a second portion 130 at 640. The second signal 150 is synchronized with the first signal 140, such that the user device 410 is configured to receive one signal (e.g., first signal 140) and seamlessly switch to the other signal (e.g., second signal 150). In one example, the user device 410 receives a first signal burst 320 as part of the first signal 140 and, based on the received first signal burst 320, determines/identifies a window of time that the user device 410 may expect to receive a subsequent first signal burst 320. That is, the user device 410 may expect to receive the subsequent first signal burst 320 within the window of time. In at least some examples, the second signal 150 is synchronized with the first signal 140 and is thus configured to transmit a second signal burst 330 within the same or a similar window of time as the subsequent first signal burst 320. In this way, when the stylus 100 is flipped such that the user device 410 switches between receiving the first signal 140 and receiving the second signal 150, the user device 410 does not need to re-determine/identify a window of time that the user device 410 may expect to receive a subsequent signal burst, thereby reducing a latency associated with switching between receiving the first signal 140 and receiving the second signal 150. That is, the user device 410 is scheduled to receive a signal (e.g., the first signal 140 or the second signal 150) within the same or a similar window of time, and determines whether the received signal is the first signal 140 or the second signal 150 based on its makeup.

The predetermined distance between the tip and the tail enables a portion of the user device (e.g., a sensor associated with a particular pixel or group of pixels) to receive one signal and not the other signal. The predetermined distance makes it physically impossible for a particular sensor to receive both the first signal and the second signal at a signal strength that may be interpreted as a desired input.

Content or makeup of the first signal 140 or of the second signal 150 (e.g., first signal bursts 320 or second signal bursts 330) enable a user device 410 to distinguish between the first signal 140 and the second signal 150 or identify a source of a signal received at the user device 410. For example, the first portion 120 may be identified as the source of a received signal based on an identification/determination that the received signal includes a beacon signal burst 340, a determination that the received signal includes a pressure signal burst 350, or based on the determination that the received signal does not include a digital signal burst 370. Similarly, the second portion 130 may be identified as the source of a received signal based on a determination that the received signal includes a beacon signal burst 360, a digital signal burst 370, or a pressure signal burst 380. After determining that the first portion 120 is the source of the received signal, the user device 410 is configured to provide a first functionality (e.g., write). After determining that that the second portion 130 is the source of the received signal, the user device 410 is configured to provide a second functionality (e.g., erase).

In addition to the first signal 140 and second signal 150, in at least some examples, the user device 410 may expect a third signal from another portion of the stylus 100. This third signal may be synchronized with the first signal 140 or with the second signal 150. The user device 410 may also expect a third signal from another stylus or peripheral device that is communicatively coupled to the stylus 100, where the other stylus or peripheral device is configured to transmit a signal that is synchronized with the first signal 140 and the second signal 150. In this way, a plurality of styluses and/or peripheral devices (e.g., a writing utensil and an erasing utensil) are configured to seamlessly interact with the user device 140.

The subject matter described herein enables a peripheral device to include a plurality of operating portions. The examples described herein enable a functionality of a stylus to be improved by including an additional interacting tip on an end opposite that of a tip of the stylus conventionally used for writing. In this way, the additional interacting tip provides additional functionality including, without limitation, erasing, writing in a thickness different from the tip conventionally used for writing, or writing in a color different from the tip conventionally used for writing. Moreover, the examples described herein enable the functionality of the stylus to be improved in an efficient and cost-effective manner by distinguishing signals based on its content or makeup. In this way, the stylus includes a plurality of operating portions while conserving resources when compared with known styluses including a stand-alone circuit for each operating portion of the stylus. Furthermore, the examples described herein enable the functionality of the stylus to be improved in a user-friendly manner by synchronizing the signals, such that a latency is reduced when switching between signals. In this way, the user device is configured to quickly identify a functionality or operation associated with the received signal or its source.

Example computer-readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this disclosure are not signals per se. Example computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an example computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

The examples illustrated and described herein as well as examples not specifically described herein but within the scope of aspects of the disclosure constitute example means for transmitting a signal, and a means for interpreting a signal. For example, the elements illustrated in FIG. 1 and/or FIG. 4, such as when encoded to perform the operations illustrated in FIG. 6 constitute at least an example means for transmitting a first signal including one of more first signal bursts, an example means for transmitting a second signal including one of more second signal bursts different from the one of more first signal bursts, and an example means for receiving a signal, identifying a source of the signal, and providing a functionality based on the received signal and/or its source.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Alternatively or in addition to the other examples described herein, examples include any combination of the following:

a first portion configured to transmit a first signal in a first pattern;

a second portion configured to transmit a second signal in a second pattern;

the first portion spaced from the second portion a distance greater than a hovering distance such that a portion of a user device receives no signal or one of the first signal and the second signal;

the first signal including one or more first signal bursts;

the first signal including a first beacon signal burst and a first pressure signal burst;

the second signal including one or more second signal bursts that are synchronized with the first signal bursts;

the second signal including a second beacon signal burst, a digital signal burst, and a second pressure signal burst;

the first signal having a first amplitude, and the second signal having a second amplitude that is identical or substantially similar to the first amplitude;

the first signal having a first frequency, and the second signal having a second frequency that is identical or substantially similar to the first frequency;

the first signal having a first repetition rate, and the second signal having a second repetition rate that is identical or substantially similar to the first repetition rate;

a power module configured to provide power to one or more of the first portion and the second portion;

a control module configured to identify an input;

a control module configured to determine an operating mode;

a control module configured to adjust one or more of the first signal and the second signal;

one or more buttons configured to receive an input;
one or more buttons configured to transmit a signal associated with the input to the control module;
a user device configured to provide a first functionality upon receiving the first signal;
a user device configured to provide a second functionality upon receiving the second signal;
a stylus including a head portion and a tail portion opposite the head portion;
a touchscreen device configured to receive one or more of the first signal and the second signal such that, on receiving the first signal, the stylus writes on the touch screen device and, on receiving the second signal, the stylus erases from the touch screen device;
generating a first signal including one or more first signal bursts, at least one first signal burst of the first signal bursts configured to be transmitted within a predetermined window of time;
transmitting the first signal from a first portion of the stylus;
generating a second signal including one or more second signal bursts synchronized with the first signal bursts, such that at least one second signal burst of the second signal bursts is configured to be transmitted within the predetermined window of time;
generating the second signal such that the second signal is distinguishable from the first signal;
transmitting the second signal from a second portion of the stylus.
receiving an input;
identifying an input;
determining an operating mode; and
adjusting one or more of the first signal and the second signal.

In some examples, the operations illustrated in FIG. 5 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

What is claimed is:

1. A stylus comprising:
a first portion configured to transmit a first signal in a first pattern comprising one or more first signal bursts, the first signal associated with a first functionality; and
a second portion configured to transmit a second signal in a second pattern comprising one or more second signal bursts similar to the one or more first signal bursts such that the first and second signals bursts each comprise a same number of pulses of energy emitted within a predefined window of time and comprise a same amplitude, the second signal associated with a second functionality different from the first functionality, wherein the one or more second signal bursts are synchronized with the one or more first signal bursts such that the one or more second signal bursts are transmitted at a same time as the one or more first signal bursts.

2. The stylus of claim 1, further comprising a power module coupled to the first portion and the second portion, the power module configured to provide power to the first portion and to the second portion.

3. The stylus of claim 1, wherein the first signal includes a first beacon signal burst and a first pressure signal burst, and the second signal includes a second beacon signal burst, a digital signal burst, and a second pressure signal burst.

4. The stylus of claim 1, further comprising a control module coupled to the first portion and to the second portion, the control module configured to:
identify an input;
based on the input, determine an operating mode; and
based on the operating mode, adjust one of the first signal and the second signal.

5. The stylus of claim 1, wherein the first signal has a first amplitude, and the second signal has a second amplitude that is substantially similar to the first amplitude.

6. The stylus of claim 1, wherein the first signal has a first frequency, and the second signal has a second frequency that is substantially similar to the first frequency.

7. The stylus of claim 1, wherein the first signal has a first repetition rate, and the second signal has a second repetition rate that is substantially similar to the first repetition rate.

8. The stylus of claim 1, wherein the first portion is spaced from the second portion a distance greater than a hovering distance such that a portion of a user device receives no signal or one of the first signal and the second signal.

9. A system comprising:
a stylus comprising a head portion and a tail portion opposite the head portion, the head portion configured to transmit a first signal in a first pattern comprising one or more first signal burst, the tail portion configured to transmit a second signal in a second pattern comprising one or more second signal bursts similar to the first pattern such that the first and second signal bursts each comprise a same number of pulses of energy emitted within a predefined window of time and comprise a same amplitude, wherein the one or more second signal bursts are synchronized with the one or more first signal bursts such that the one or more second signal bursts are transmitted at a same time as the one or more first signal bursts; and
a touchscreen device configured to receive the first signal and the second signal such that, on receiving the first signal, the stylus writes on the touch screen device and, on receiving the second signal, the stylus erases from the touch screen device.

10. The system of claim 9, wherein the stylus further comprises a power module coupled to the head portion and the tail portion, the power module configured to provide power to the head portion and to the tail portion.

11. The system of claim 9, wherein the first signal includes a first beacon signal burst and a first pressure signal burst, and the second signal includes a second beacon signal burst, a digital signal burst, and a second pressure signal burst.

12. The system of claim 9, wherein the first signal has a first amplitude, a first frequency, and a first repetition rate, and the second signal has a second amplitude, a second frequency, and a second repetition rate, the second amplitude substantially similar to the first amplitude, the second frequency substantially similar to the first frequency, and the second repetition rate substantially similar to the first repetition rate.

13. The system of claim 9, wherein the stylus further comprises a control module configured to:
determine an operating mode; and
based on the operating mode, adjust one of the first signal and the second signal.

14. The system of claim 9, wherein the head portion is spaced from the tail portion a distance greater than a hovering distance such that a portion of the touchscreen device receives no signal or one of the first signal and the second signal.

15. A computer-implemented method for managing operation of a stylus, the method comprising executing on one or more computing devices the operations of:
generating a first signal including one or more first signal bursts, at least one first signal burst configured to be transmitted within a predetermined window of time;
transmitting the first signal from a first portion of the stylus;
generating a second signal including one or more second signal bursts similar to the one or more first signal bursts such that the first and second signal bursts each comprise a same number of pulses of energy emitted within a predefined window of time and comprise a same amplitude, wherein the one or more second signal bursts are synchronized with the one or more first signal bursts, such that at least one second signal burst is configured to be transmitted at a same time as the at least one first signal bursts; and
transmitting the second signal from a second portion of the stylus.

16. The method of claim 15, wherein the first signal with a first amplitude, a first frequency, and a first repetition rate, wherein the second signal is generated with a second amplitude, a second frequency, and a second repetition rate, the second amplitude substantially similar to the first amplitude, the second frequency substantially similar to the first frequency, and the second repetition rate substantially similar to the first repetition rate.

17. The method of claim 15, further comprising:
identifying an input;
based on the input, adjusting one of the first signal and the second signal.

18. The method of claim 17, further comprising:
based on the input, determine an operating mode; and
based on the operating mode, adjust one of the first signal and the second signal.

19. The method of claim 18, wherein and the tail portion is configured to transmit the second signal.

20. The method of claim 15, wherein a head portion of the stylist is configured to transmit the first signal.

* * * * *